United States Patent
Green (10) Patent No.: US 7,051,836 B2
(45) Date of Patent: May 30, 2006

(54) SUPPORT HARNESS

(75) Inventor: Sherry Jean Green, Jasper, GA (US)

(73) Assignee: Trophyline, LLC, Jasper, GA (US)

( * ) Notice: Subject to any disclaimer, the term of this patent is extended or adjusted under 35 U.S.C. 154(b) by 0 days.

(21) Appl. No.: 10/463,641

(22) Filed: Jun. 17, 2003

(65) Prior Publication Data

US 2004/0154863 A1    Aug. 12, 2004

Related U.S. Application Data

(60) Provisional application No. 60/390,801, filed on Jun. 20, 2002.

(51) Int. Cl.
*A62B 35/00* (2006.01)

(52) U.S. Cl. .......................... 182/7; 182/187
(58) Field of Classification Search ................ 182/3–7, 182/9, 187
See application file for complete search history.

(56) References Cited

U.S. PATENT DOCUMENTS

| | | | |
|---|---|---|---|
| 3,757,893 A * | 9/1973 | Hobbs | 182/6 |
| 4,197,816 A * | 4/1980 | Lusch | 182/3 |
| 4,446,943 A * | 5/1984 | Murray | 182/3 |
| 4,687,074 A | 8/1987 | Green | |
| 4,936,416 A | 6/1990 | Garon | |
| 4,955,456 A | 9/1990 | Mulkey | |
| 4,991,689 A * | 2/1991 | Cole | 182/3 |
| 5,036,548 A | 8/1991 | Grilliot et al. | |
| 5,067,585 A | 11/1991 | Bell | |
| 5,136,724 A | 8/1992 | Grilliot et al. | |
| 5,145,027 A | 9/1992 | Petzl et al. | |
| 5,183,007 A * | 2/1993 | Vincent | 119/770 |
| 5,228,412 A | 7/1993 | Bell | |
| 5,449,309 A | 9/1995 | McCarty | |
| D391,685 S | 3/1998 | Kinniburgh | |
| 5,878,833 A | 3/1999 | Bell | |
| 6,016,891 A | 1/2000 | Sava | |
| 6,125,966 A | 10/2000 | Jones | |
| 6,213,365 B1 * | 4/2001 | Stocke et al. | 224/665 |

* cited by examiner

*Primary Examiner*—Alvin Chin-Shue
(74) *Attorney, Agent, or Firm*—Akerman Senterfitt; Michael K. Dixon (57) ABSTRACT

A harness system for supporting a person off of a ground surface. The harness system may include a seat supported by a strap attached to the seat. The strap may form one or more leg containing loops for keeping a person securely positioned in the harness. The harness may also include a climbing strap for securing the harness loosely to a support device, such as a tree, while a person climbs a support device. The harness may be secured to a person by tightening a waist strap around the person's waist. A top strap section forming a portion of the waist strap may be used to support the weight of a person sitting in the harness. A hanging strap may be used to secure the harness to a support object by forming a loop in the hanging strap around the top strap section of the waist strap.

28 Claims, 3 Drawing Sheets

SUPPORT HARNESS

CROSS-REFERENCE TO RELATED APPLICATION

This application claims the benefit of U.S. Provisional Application No. 60/390,801, filed Jun. 20, 2002.

FIELD OF THE INVENTION

The invention is directed generally to harnesses, and more particularly, to harnesses for suspending a person from a tree, tree limb, or other structure in a safe and comfortable manner.

BACKGROUND

Big-game hunting is a popular recreational activity pursued by hunters in many parts of the United States, Canada and else where in the world. Big-game animals typically include animals such as, but not limited to, elk, whitetail deer, blacktail deer, mule deer, wild hog, javelina, black bear, and brown bear. Many of these animals have a good sense smell and some have good eyesight. A popular method of harvesting many of these animals is by using a tree stand. A tree stand is a device that allows a hunter to remain motionless for many hours while being suspended above the ground anywhere between 10 feet to 50 feet above the ground. Tree stands may be found in many configurations. For instance, tree stands may be permanently attached to a tree and built from pressure treated lumber in a configuration dictated by the shape of a tree, but generally including a seat and platform. Tree stands may also be portable. Portable tree stands include ladder stands, climbing stands and hanging or lock-on tree stands. Typically portable tree stands are made of metal, such as aluminum or steel.

Yet another portable tree stand that has gained acceptance by hunters is a tree harness, as shown in U.S. Pat. No. 4,687,074, referred to as the '074 patent. The '074 patent discloses a tree harness having a flexible seat for supporting a person in a tree above the ground. The flexible seat, which is typically made of leather, fits around the buttocks and hips of a person. The seat is secured in place with a waist strap that is adjustable using a fastener, but only after disconnecting the fastener. The seat and person are supported by an adjustable support strap having a first end that loops around a portion of a tree, such as a limb or trunk, and a second end that loops around the waist strap used to secure the seat to a person. The adjustable support strap is secured to itself using a releasable hook.

The tree harness disclosed in the '074 patent accomplished the objective of suspending a person in a tree in such a position to allow the person to operate a firearm such as a rifle or bow and arrow. However, the tree harness of the '074 patent is difficult and unsafe to adjust while a person is seated in the tree harness and suspended from a tree. For instance, the tree harness provides no manner for securing the person to the tree while the person is connecting the adjustable support strap to a tree trunk or limb or while the person is climbing a tree. Furthermore, the waist strap may not be adjusted while a person is seated in the tree harness and suspended from a tree without first disconnecting the fastener in the waist strap and having the person lift himself from the seat by standing on a step or branch. Opening the fastener in the waist strap while suspended from a tree at any height is dangerous because there exists the possibility that the person could fall from the tree harness. In addition, the adjustable support strap that is wrapped around the tree and supports the seat may only be adjusted by removing the releasable clip from the adjustable support strap, which may only be accomplished by completely removing all weight from the adjustable support strap. Thus, the person must stand on a limb, step, or other item to accomplish this task. This is a very dangerous feat while hunting from a tree because the user must first properly secure a firearm and then must balance on a limb while attempting to disconnect the releasable clip, insert the releasable clip into a different hole, and reestablish a position in the seat without falling from the tree. Under most conditions this cannot be accomplished in a safe manner.

Therefore, there exists a need for a harness including safety features allowing a person to safely adjust various straps in a safe manner while being suspended off of the ground to obtain a comfortable position in the harness.

SUMMARY OF THE INVENTION

This invention is directed to a harness capable of supporting a person off of a ground surface by hanging from a support object. In at least one embodiment of this invention, a harness supports a person from a tree in a position enabling the person to safely and effectively operate a firearm. In addition, the harness may be used for other uses including, but not limited to, harnesses for firefighters and other rescue personnel, tree pruners, utility workers performing work on power or other type utility poles, for repelling, such as by high rise window washers, and by other people needing to be safely suspended off of the ground.

The harness may include a seat that is supported by a hanging strap. The hanging strap may be coupled to a support object, which may be, but is not limited to a tree trunk, tree limb, pole or other object. The seat may be flexible and may support a person by cradling the buttocks and hips of the person. The seat may have a first top corner, a second top corner, a first side edge, and a second side edge opposite from the first side edge. The periphery of the seat may be reinforced with a strap that is configured to form two leg containing loops through which a person using the harness places his or her legs. In one embodiment, a first leg containing loop may be coupled to a first side edge, and a second leg containing loop may be coupled to a second side edge. The leg containing loops support the weight of the person in an emergency situation where the person has begun to fall from the harness. Otherwise, the leg containing loops do not support any weight. The ends of the strap may be coupled together in a single connection using a "WW" stitching pattern for maximum strength. One or more pouches may be coupled to the flexible seat for storing various items for hunting, tree pruning, repelling, rescue operations, firefighting operations and the like. These pockets may be attached to the backside of the seat and may have a closure member for securing the contents of the pockets.

The harness may include a climbing strap for connecting a person to a support object while the person is climbing the support object. The climbing strap may be formed from a first strap including a releasable hook, and a second strap including a fastener. The first and second straps may be wrapped around a support object and coupled together to keep the person from falling away from the support object while the person is climbing the tree and while the person is attaching the hanging strap to the support object. The climbing strap may be tightened around the support object by pulling a loose end of the second strap. The climbing strap need not be disconnected to be tightened.

The harness may include a waist strap for coupling the seat of the harness to the hanging strap and for pulling the two sides of the harness together around the waist of a person. The waist strap may extend between the first top corner and the second top corner of the seat. The waist strap may include a top strap section and a bottom strap section. The waist strap may be tightened around a person's waist by pulling on the top strap section, which causes the bottom strap section and the periphery of the seat to tighten around the waist of the person and forms slack in the top waist strap. While the waist strap is adjustable, it may not be taken apart to form two separate straps. Rather, the waist strap is adjusted by pulling one side of the top or bottom strap section through the fastener. The slack formed in the top strap section is used to connect the harness to a support object using a hanging strap. Using the harness in this manner created a two point harness system. In an alternative embodiment, the top and bottom strap sections are adjusted to have generally even lengths. The loop formed by the top and bottom strap sections collectively may receive a hanging strap to support the harness using two interlocking loops.

The hanging strap may be any strap capable of supporting the average weight of a person, but in the interest of safety, should be able to support 500 pounds or more. The hanging strap may include a releasable hook and a fastener capable of receiving the releasable hook. The hanging strap supports the weight of a person and is used to couple the harness to a support object. The hanging strap may be attached to a support object in many ways. In one embodiment, the hanging strap is attached to a support object by wrapping the strap around the support object one or more times and tying the end of the hanging strap having the releasable hook around the hanging strap. In this configuration, the releasable hook hangs over the portion of the hanging strap wrapped around the support object and hangs about 6 to about 16 inches beneath the tied portion of the hanging strap. The fastener may then be feed through the loop formed by the top strap section of the waist strap and attached to the releasable hook on the hanging strap. In the alternative embodiment, the fastener may be feed through the loop formed by the top and bottom strap sections collectively to form two interlocking loops. The person may then sit in the seat and be supported by the hanging strap.

This configuration forms two interlocking loops that are capable of rotating freely within each other. Specifically, both the hanging strap and the top strap section of the waist strap form loops. The interlocking loops are advantageous because the loops enable a person seated in the harness to move easily in relation to the support object.

The height of the seat when the harness is supported by the hanging strap may also be adjusted using the waist strap without disconnecting the hanging strap from the loop formed by the top strap section. Rather, the height of the seat may be adjusted using the fastener, which may be referred to as an adjuster buckle, while the hanging strap remains attached to the waist strap and to a tree or other object, thereby eliminating the possibility of the person falling from the tree while adjusting the height of the seat.

An advantage of this harness is that that harness is configured to allow a person using the device to adjust the height at which the seat is positioned while hanging from a support device without detaching the harness from a tree or other support object, thereby eliminating the possibility of the person falling from the tree while adjusting the height of the seat.

Another advantage of this harness is that the harness includes a waist strap for securing the seat around the waist of a person. Moreover, the waist strap is adjustable while the harness is suspended in a tree without requiring the person to release the waist strap and be exposed to the danger of falling from the harness.

Yet another advantage of this harness is that the connection devices may be coated with a resilient material for eliminating metallic sounds, which spook game animals, and for protecting the connection devices from damaging effects of rain and the like.

Still another advantage of this harness is that the harness includes a climbing strap for preventing a person from falling from a tree while climbing a tree or while attaching the hanging strap to the tree.

Another advantage of this harness is that the climbing strap is adjustable and capable of accommodating people and trees of many sizes.

Yet another advantage of this harness is that it may include one or more loops for holding gear while using the harness. The loops also enable each user to adjust a harness to accommodate the specific needs of a user. In addition, pouches, which may be adapted for specific uses, may be attached to the waist loops and may be positioned in convenient locations around the entire outer perimeter of a harness.

These and other features and advantages of the present invention will become apparent after review of the following drawings and detailed description of the disclosed embodiments.

BRIEF DESCRIPTION OF THE DRAWINGS

The accompanying drawing, which is incorporated in and form a part of the specification, illustrate preferred embodiments of the presently disclosed invention(s) and, together with the description, disclose the principles of the invention(s). These illustrative figures include the following.

DETAILED DESCRIPTION

Figure 1:
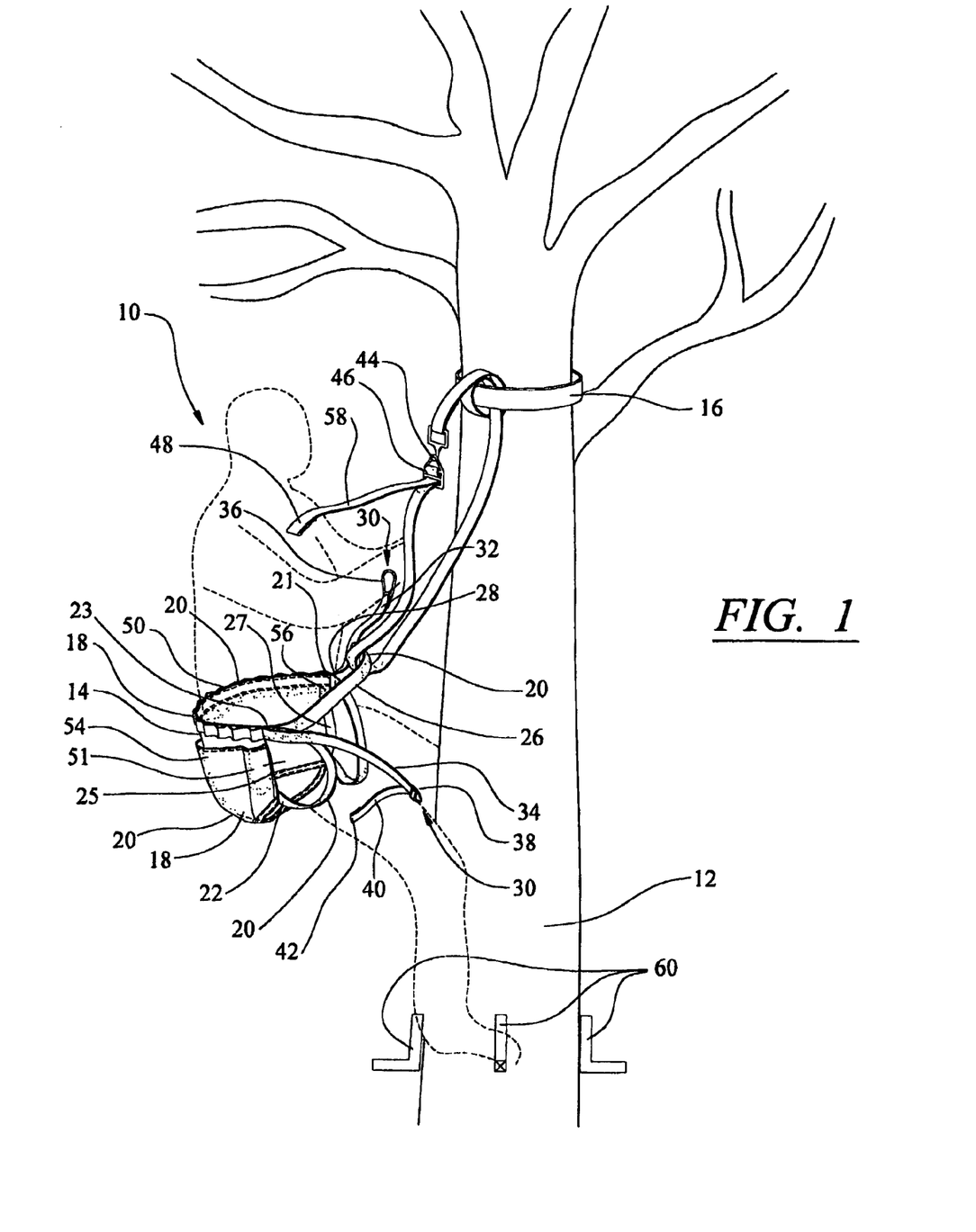
FIG. 1 is side perspective view of a harness according to one or more aspects of this invention.
Figure 2:
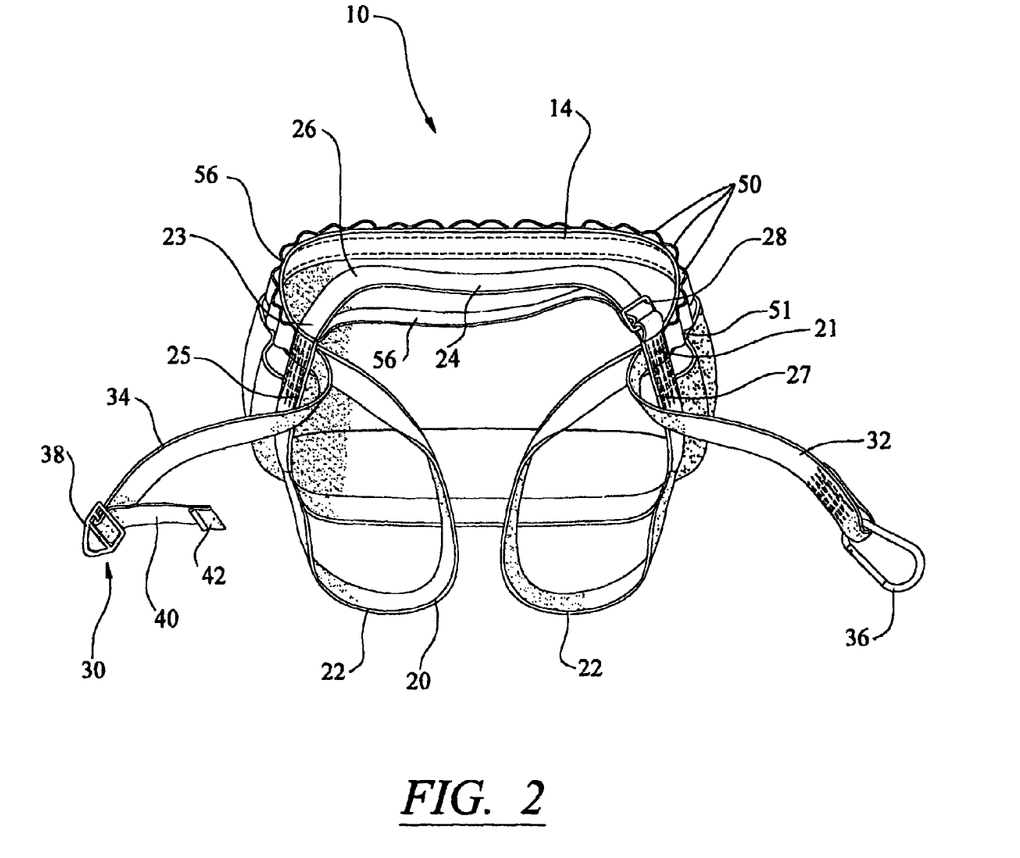
FIG. 2 is a frontal perspective view of the harness shown in FIG. 1.

FIGS. 1 and 2 illustrate a harness 10 capable of supporting a person off of a ground surface by hanging from a support object 12. Support object 12 may be, but is not limited to, a tree, a building, a rope, a rock face, a telephone pole, a power pole, or other such device. Harness 10 includes a seat 14 for supporting a person and a hanging strap 16 for coupling the seat 14 to a support object 12. Seat 14 may be composed of numerous materials, such as, but not limited to, leather, nylon, CORDURA, neoprene, any combination of these materials, and other natural and synthetic fabrics and materials. Seat 14 is configured to fit loosely around the buttocks and hips of a person and to conform to the shape of a person. Seat 14 may have one or more sizes to accommodate small children and large adults. Seat 14 may include a first top corner 21, a second top corner 23, a first side edge 25, and a second side edge 27.

A periphery 18 of seat 14 may be supported and reinforced with a strap 20. Strap 20 may be attached to periphery 18 of seat 14 and form leg containing loops 22 that act as a safety mechanism. In at least one embodiment, leg containing loops 22 may include a first leg containing loop coupled to first side edge 25 and a second leg containing loop coupled to a second side edge 27. Leg containing loops 22 may be formed from a single strap that is also coupled to periphery 18 of seat 14. When a person is seated in seat 14, leg containing loops 22 loosely surround the legs of the person and do not restrict the person's ability to move or change positions. Leg containing loops 22 support the weight of a person if the person falls from seat 14.

Figure 4:
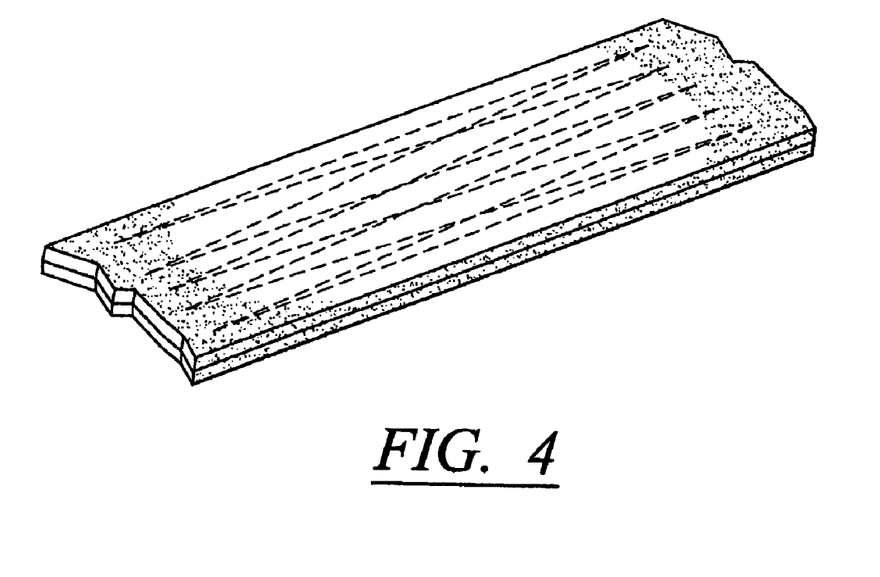
FIG. 4 is a detail of a stitch pattern.

In other embodiments, strap 16 may be composed of more than one strap. Strap 16 may be coupled to seat 14 using stitching or other attachment mechanisms. In one embodiment as shown in FIG. 4, the stitching may formed from a "WW" stitch pattern. The "WW" pattern may be about 6 inches long to secure the loose ends of strap 16 to seat 14 with maximum strength. The "WW" stitch pattern may have a minimum weight bearing capacity of about 500 pounds.

Harness 10 may also include waist strap 24. Waist strap 24 may be formed from top strap section 26 and bottom strap section 56. In one embodiment, waist strap 24 extends between top corner 21 and top corner 23. Top strap section 26 may be capable of receiving hanging strap 16 to couple harness 10 to a support object 16, and bottom strap section 56 may be capable of pulling top corners 21 and 23 of seat 14 together to secure waist strap 24 and seat 14 to a person. Top strap section 26 and a bottom strap section 56 may each have a weight bearing capacity of at least 500 lbs. In other embodiments, waist strap 24 may have other amounts of strength. Waist strap 24 can be tightened or loosened around the waist of a person by pulling top strap section 26 through fastener 28. In one embodiment, waist strap 24 is formed from overlapping layers of straps, bottom strap section 56 is capable of being fastened tightly against the waist of a person seated in seat 14 while top strap section 26 may form a loop to receive hanging strap 16 for supporting seat 14.

The lengths of top strap section 26 and bottom strap section 56 of waist strap 24 may be adjusted using fastener 28. In at least one embodiment, fastener 28 may have a load bearing capacity of at least 500 pounds and may be coated with a material, such as, but not limited plastic, rubber, or other material for noise reduction. Fastener 28 enables waist strap 24 to be adjusted without having to disconnect waist strap 24, thereby never putting the person in danger of falling from support object 12. In addition, waist strap 24 may be adjusted while waist strap 24 supports the entire weight of a person seated in seat 14. Waist strap 24 may be adjusted by pulling on top strap section 26 or bottom strap section 56 depending on whether waist strap is desired to be tightened or loosened around the waist of a person. In at least one embodiment, fastener 28 may be coupled to top corner 23 of seat 14.

In at least one embodiment, a single strap may be used to form strap 20 and waist strap 24. The single strap wraps around periphery 18 of seat 14, forms leg containing loops 22 and forms top strap section 26 and bottom strap section 56 by passing through fastener 28. Using a single strap reduces the number of stitched connections to a single connection. Thus, the single strap may improve the reliability and safety of harness 10.

Harness 10 may further include a climbing strap 30 for assisting a person while climbing a support object 12 until the person has coupled top strap section 26 of waist strap 24 to hanging strap 16. Climbing strap 30 may be used while climbing or descending a support object 12 and while the person is attaching hanging strap 16 to the support object 12. Climbing strap 30 may be formed from a single strap formed from a first side strap section 32 and a second side strap section 34. In other embodiments, climbing strap 30 may be formed from two or more straps. First side strap section 32 may be coupled to first side edge 25, and second side strap section 34 may be coupled to second side edge 27. First side strap section 32 may include a hook 36 sized to be received by fastener 38 that is coupled to second side strap section 34. The length of first side strap section 32 may or may not be adjustable. In an alternative embodiment, climbing strap 30 formed from a single strap may be attached to "D" rings, or other similar fasteners, attached to first top corner 21 or a second top corner 23, respectively.

In one embodiment, fastener 38 has a weight bearing capacity of about 500 pounds and may be coated with a protection material to reduce sound, such as, but not limited to, plastic, rubber or a wear resistant paint. Fastener 38 may be in the shape of a V-ring, which reduces noise during use. Second side strap section 34 may also have a length of three of more feet. During use, first side strap section 32 and second side strap section 34 are wrapped around the circumference of a support object 12, and fastener 38 is coupled to hook 36. The length of climbing strap 30 may then be adjusted using loose end 40. Some slack should be left in climbing strap 30 to enable a person to climb a support object 12. The climbing strap 30 may be tightened around the tree to bring a person seated in seat 14 closer to the tree by pulling on loose end 40. Climbing strap 30 may also include a stop 42, such as, but not limited to, a butterfly end stop, for preventing accidental removal of fastener 38 from climbing strap 30.

Seat 14 may be coupled to a support object 12 using hanging strap 16, as shown in FIG. 1. Seat 14 and hanging strap 16 are configured so that when a person or other object is supported by the seat 14, the center of gravity of the person is below the pivot points, where are the top corners 21 and 23 of the seat 14. As a result, the seat 14 is stable and prevents a person from flipping over in the seat 14 during use.

Figure 3:
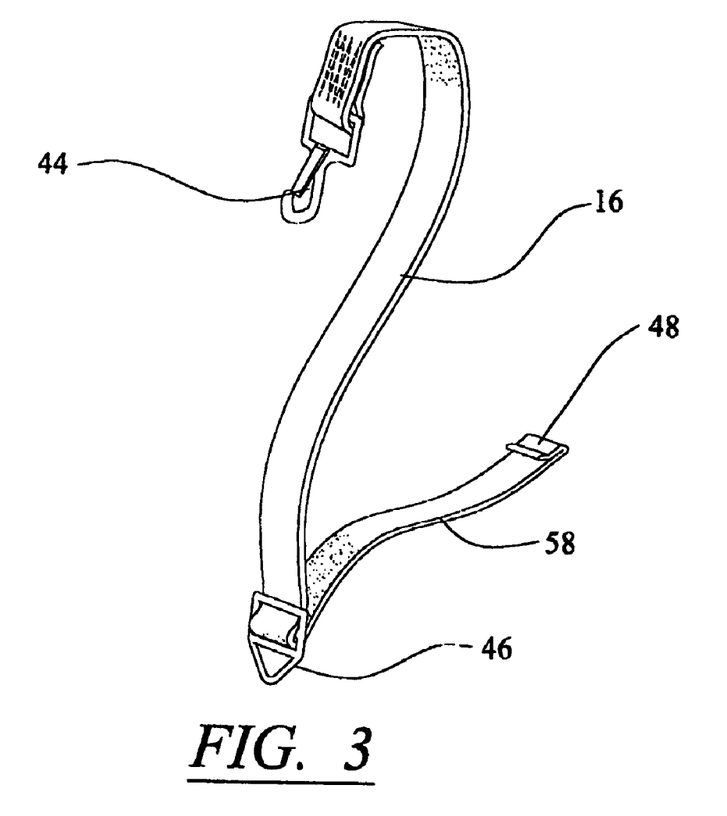
FIG. 3 is a perspective view of a hanging strap.

Hanging strap 16, as shown in FIGS. 1 and 3, may vary in length and strength, but in one embodiment, hanging strap 16 is about 12 feet long and formed from a strap having a width of about 1¾ inches and weight bearing capacity within the range between about 500 pounds to about 12,000 pounds. In other embodiments, hanging strap 16 may be shorter than 12 feet or longer than 12 feet, and, in one embodiment, may be as along as 100 feet. Hanging strap 16 may include a releasable hook 44 attached to one end and a fastener 46 slidably coupled to hanging strap 16. In one embodiment, releasable hook 44 may have a weight bearing capacity of about 500 pounds, and fastener 46 may have a weight bearing capacity within a range between about 500 pounds and about 2,500 pounds. Fastener 46 may also be coated with a protection material to reduce sound, such as, but not limited to, plastic, rubber, or a relatively wear resistant paint, or other item. Fastener 46 may be in the shape of a V-ring, which reduces noise during use.

Releasable hook 44 may be attached to hanging strap 16 by feeding hanging strap 16 through a connection ring on releasable hook 44 and coupling hanging strap 16 to itself using, for instance, stitching. In one embodiment, a stitch pattern, such as, but not limited to, a "WW" stitch pattern shown in FIG. 4, having a weight bearing capacity of between about 500 pounds to more than about 3,000 pounds may be used to secure releasable hook 44 to hanging strap 16. Hanging strap 16 may also include a stop 48 at the end of hanging strap 16 opposite the releasable hook 44 to prevent fastener 46 from being removed from hanging strap 16. Stop 48 may be, but is not limited to, a butterfly stop.

Harness 10 may also include numerous pouches 54 coupled to seat 14 for storing first side strap section 32 and second side strap section 34 of climbing strap 30 while not being used; hunting aides, such as calls, hand warmers, gloves, insect repellant, scents, binoculars, hats, and drinks; and other such items. Pouch 54 may form a significant portion of a backside surface of the seat 14, as shown in FIG. 1. Pouch 54 may have a closure mechanism such as, but not limited to: a drawstring; a flap; a releasable, reusable attachment device such as, but not limited to, VELCRO, or a zipper; or other mechanism. Harness 10 may also include one or more side pouches 51. Side pouches 51 may have different sizes to store and protect numerous items. Side pouches 51 and pouch 54 may be composed of any durable material, such as leather, CORDURA, nylon, mesh, neoprene, or other appropriate material.

In one embodiment, as shown in FIG. 1, harness 10 may include pouch loops 50 formed from strap 16 for holding various items, such as flashlights, pocket knives, and other items having attachment clips. Pouch loops 50 may be formed with generally vertical stitching forming a plurality of vertical lines spaced apart from each other. In one embodiment, pouch loops 50 may be about two inches wide. Pouch loops 50 may be formed using strap climbing strap 30 where climbing strap 30 is attached to periphery 18 of seat 14.

Harness 10 may be used for numerous purposes. For instance, harness 10 may be used as a tree stand for suspending hunters in a tree above the ground while hunting. The hunter may be suspended anywhere between a few feet above the ground to more than sixty feet above the ground. Harness 10 may also be used by hunters to trim the limbs from trees in the woods. Harness 10 may also be used by other people to trim limbs from trees growing in subdivisions, on golf courses, on school grounds and in other locales. Further, harness 10 may be used as a repelling harness by firefighters and other rescue personnel, high rise building window washers, electric utility workers, and others. Thus, harness 10 may be used for any purpose in which a person needs to be suspended from the ground in a safe manner while having the freedom of movement to achieve numerous tasks.

Harness 10 may be used by a person first placing harness 10 around buttocks of a person. The person may step into harness 10 by stepping through the gap between waist strap 24 and seat 14, putting a leg through each leg containing loop 22 and placing seat 14 in contact with the buttocks of the person. Waist strap 24 may then tightened using fastener 28 to secure harness 10 around the waist of the person. Adjusting the length of waist strap 24 causes the bottom strap section 56 of waist strap 24 to be tightened against the waist of the person and the top strap section 26 to form a loop with slack that is capable of being attached to hanging strap 16. The top strap section 26 may be tucked into a side pouch 51 until needed. The person may then hike to his hunting location or scale a tree 12 if already beside the tree the person intends to climb. The person may climb the tree 12 in any manner possible. A common method of climbing trees is by using portable steps 60 having screws that easily screw into a tree. Portable steps 60 having other configurations may be attached to a tree 12 by wrapping a climbing strap 30 around the tree.

Preferably, before the person begins to climb the tree 12, first side strap section 32 and second side strap section 34 of climbing strap 30 are wrapped around the tree 12 and secured together using releasable hook 36 and fastener 38. The length of climbing strap 30 may be adjusted by pulling on the loose end 40 of climbing strap 30, which is proximate to stop 42. The person may then climb the tree 12 using these portable steps 60 and limbs of the tree 12 where available until the person has reached a desired height. While climbing the tree 12, the person must guide the climbing strap 30 upward along the tree and prevent it from snagging bark during the climb. The climbing strap 30 must be momentarily disconnected to climb past limbs on tree 12. Thus, a tree that is the safest to climb with harness 10 is a tree having no branches on the trunk between the ground and the height to which the climber intends to climb. A climber climbing a tree 12 having this description will not have to disconnect climbing strap 30 until harness 10 is safely secured to the tree 12 using hanging strap 16.

Once at the desired height above the ground, hanging strap 16 is retrieved from pouch and is secured to the tree 12. Hanging strap 16 may be secured to the tree 12 or tree limb in numerous manners. In one embodiment, hanging strap 16 is wrapped around the tree 12 one or more times above the person's head leaving the releasable hook 44 between about 6 and 16 inches from the tree 12. In another embodiment, hanging strap 16 is wrapped around tree 12 at least two times. The end of hanging strap 16 attached to releasable hook 44 is tied around hanging strap 16 between the tree 12 and hanging strap 16 so that releasable hook 44 hangs over the hanging strap 16 coupled to the tree 12. Fastener 46 coupled to hanging strap 16 is feed through a loop formed by top strap section 26 and attached to releasable hook 44. This forms two interlocking loops, which include: the loop formed by the top strap section 26 and the loop formed by the hanging strap 16. The interlocking loops formed by top strap section 26 and hanging strap 16 allow a person to turn easily from side to side and to face away from the support object 12 to which harness 10 is coupled. The person may now sit in seat 14 and be supported by hanging strap 16.

In yet another embodiment, a first person, who may be an experienced user, may attached the hanging strap 16 to the tree 12. A second person, who may be, but is not limited to, an inexperienced person, such as a child, may pass the hanging strap 16 through the waist strap 24 and attach the releasable hook 44 to the fastener 46 while the second person is on a ground surface. As the second person climbs the tree 12, the length of the hanging strap 16 may be adjusted.

In another embodiment, the waist strap 24 may be loosened so that the bottom strap section 56 and the top strap section 26 are approximately the same length. The fastener 46 coupled to hanging strap 16 may be feed through a loop formed collectively by top strap section 26 and bottom strap section 56 and attached to releasable hook 44; thus forming a two interlocking loops. This embodiment provides a user with increased mobility while seated in the harness 10 without compromising safety.

The height at which the person is supported may be adjusted by pulling on adjusting end 58 of hanging strap 16. The person may either raise or lower the height at which seat 14 is positioned relative to the location at which hanging strap 16 is coupled to the tree. The height of the strap may be adjusted by the person holding the adjusting end 58 of the hanging strap 16 in one hand and the tree 12 with the other hand. The person can reduce the load on fastener 46 by holding the tree 12, thereby making the adjustment process easier when creating more distance between the seat 14 and the releasable hook 44 and the fastener 46. The person is most comfortable by adjusting the height of seat 14 so that about 60 percent of the person's weight is supported by seat 14 and the remaining 40 percent of the weight is supported by the person's feet. By enabling a climber to adjust the height of the climber's feet relative to the climber's waist, the climber can place himself in a comfortable position which is extremely important for big game hunting.

After hanging strap 1 has been attached to waist strap 24, first side strap section 32 and second side strap section 34 of climbing strap 30 may be disconnected and placed in side pouches 51. Now, the person is free to move 360 degrees around the tree. In most situations, there may not exist enough limbs around the feet of the person to provide adequate support. In these situations, the person should position one or more portable steps 60 around the tree at the height of his or her feet when the person is in a normal or slightly elevated sitting position. Attaching steps 60 in this manner may be done after hanging strap 16 has been attached to waist strap 24 or while climbing the tree 12. These steps 60 provide the person with a platform for walking completely around the tree 12 and rotating to face the tree 12 or face directly away from the tree 12.

If the person determines that bottom strap section 56 of waist strap 24 is too tight or too loose, bottom strap section 56 may be adjusted by pulling bottom strap section 56 or top strap section 26 through fastener 28. This adjustment may be made while the person is seated in seat 14 and hanging from hanging strap 16.

The terms and expressions which have been employed herein are used as terms of description and not of limitation, and there is no intention, in the use of such terms and expressions, of excluding any equivalents of the features shown and described or portions thereof. Having thus described the invention in detail, it should be apparent that various modifications can be made in the present invention without departing from the spirit and scope of the following claims.

I claim:

1. A harness for suspending a person off of a ground surface, comprising:
   a seat having a first top corner, a second top corner, a first side edge, and a second side edge opposite from the first side edge, the seat being supported by a single strap attached to the seat;
   the single strap forming a first leg containing loop, a second leg containing loop, and a waist strap, wherein the first leg containing loop is formed on the first side edge and the second leg containing loop is formed on the second side edge and wherein the waist strap extends between the first top corner and the second top corner and forms at least a top strap section and a bottom strap section that forms a closed loop of a fixed dimension, wherein the top strap section extends between the first top corner and the second top corner of the seat and the bottom strap section extends between the first top corner and the second top corner of the seat;
   a fastener affixed to one of said top corners with the waist strap threaded therethrough for adjusting lengths of the top strap section and the bottom strap section wherein shortening the bottom strap section lengthens the top strap section by an equal amount; and
   wherein the harness is capable of being supported by the top strap section of the waist strap.

2. The harness of claim 1, wherein the waist strap is coupled to the first top corner of the seat and the fastener is coupled to the second top corner of the seat.

3. The harness of claim 1, further comprising a hanging strap forming interlocking loops with the top strap section of the waist strap without engaging the bottom swap section and capable of being attached to a support object.

4. The harness of claim 3, wherein the hanging strap comprises a hook coupled to an end of the hanging strap and a fastener slidably coupled to the hanging strap for receiving the hook.

5. The harness of claim 3, wherein the hanging strap is adapted to form a loop for grasping the top swap section of the waist strap, wherein the size of the loop is adjustable without releasing the hook from the fastener.

6. The harness of claim 1, further comprising a climbing strap formed from a first strap section extending from the seat and a second strap section extending from the seat.

7. The harness of claim 6, wherein the first strap section extends from the first side edge of the seat and includes a hook, and the second strap section extends from the second side edge of the seat and includes a fastener for receiving the hook.

8. The harness of claim 7, wherein the fastener is slidably coupled to the second strap.

9. The harness of claim 6, wherein the climbing strap is formed from a single strap.

10. The harness of claim 6, wherein the climbing strap extends along a top edge of the seat from at least the first edge to the second edge and forms at least one pouch loop.

11. The harness of claim 1, further comprising at least one pouch coupled to an outside surface of the seat.

12. The harness of claim 1, further comprising at least one pouch loop coupled to the seat.

13. A harness system for suspending a person off of a ground surface, comprising:
    a seat having a first top corner, a second top corner, a first side edge, and a second side edge opposite from the first side edge, the seat being supported by a single strap attached to the seat;
    the single strap forming a first leg containing loop, a second leg containing loop, and a waist strap, wherein the first leg containing loop is formed on the first side edge and the second leg containing loop is formed on the second side edge and wherein the waist strap extends between the first top corner and the second top corner and forms at least a top strap section and a bottom strap section that forms a closed loop of a fixed dimension;
    a fastener affixed to one of said top corners with the waist strap threaded therethrough for adjusting lengths of the top strap section and the bottom strap section wherein shortening the bottom strap section lengthens the top strap section by an equal amount;
    wherein the harness is capable of being supported by the top strap section of the waist strap;
    a hanging strap forming interlocking loops with the waist strap for supporting the seat; and
    wherein a size of the loop formed by the hanging strap is adjustable by moving a portion of a hanging strap through a fastener without being required to disconnect the loop formed by the hanging strap.

14. The harness system of claim 13, further comprising a climbing strap formed from a first strap section extending from the seat and a second strap section extending from the seat.

15. The harness system of claim 13, wherein the first strap section extends from the first side edge of the seat and includes a hook, and the second strap section extends from the second side edge of the seat and includes a fastener slidably coupled to the second member for receiving the hook.

16. The harness system of claim 14, wherein the climbing strap extends along a top edge of the seat from the first edge to the second edge and forms at least one pouch loop.

17. The harness system of claim 13, further comprising at least one pouch coupled to an outside surface of the seat.

18. The harness system of claim 13, further comprising at least one pouch loop coupled to the seat.

19. A harness for suspending a person off of a ground surface, comprising:
   a seat having a first top corner, a second top corner, a first side edge, and a second side edge opposite from the first side edge, the seat being supported by a single strap attached to the seat;
   the single strap forming a first leg containing loop, a second leg containing loop, and a waist strap, wherein the first leg containing loop is formed on the first side edge and the second leg containing loop is formed on the second side edge and wherein the waist strap extends between the first top corner and the second top corner and forms at least a top strap section and a bottom strap section that forms a closed loop of a fixed dimension, the waist strap capable of supporting the harness;
   a fastener affixed to one of said top corners with the waist strap threaded therethrough for adjusting a length of the waist strap wherein shortening the bottom strap section lengthens the top strap section by an equal amount; and
   a climbing strap formed from a first climbing strap section extending from the seat and a second climbing strap section extending from the seat for loosely attaching the harness to a support object by the person seated in the harness.

20. The harness of claim 19, wherein the first climbing strap section extends from the first side edge of the seat and includes a hook, and the second climbing strap section extends from the second side edge of the seat and includes a fastener for receiving the hook.

21. The harness of claim 20, wherein the fastener is slidably coupled to the second strap.

22. The harness of claim 19, wherein the climbing strap is formed from a single strap.

23. The harness of claim 19, wherein the climbing strap extends along a top edge of the seat from at least the first edge to the second edge and forms at least one pouch loop.

24. The harness of claim 19, further comprising a hanging strap capable of being attached to a support object and supporting the seat by forming interlocking loops with a top strap section of the waist strap.

25. The harness of claim 24, wherein the hanging strap comprises a hook coupled to an end of the hanging strap and a fastener slidably coupled to the hanging strap for receiving the hook.

26. The harness of claim 25, wherein the hanging strap is adapted to form a loop for grasping the waist strap, wherein a size of the loop is adjustable without releasing the hook from the fastener.

27. The harness of claim 19, further comprising at least one pouch coupled to an outside surface of the seat.

28. The harness of claim 19, further comprising at least one pouch loop coupled to the seat.

* * * * *

UNITED STATES PATENT AND TRADEMARK OFFICE
CERTIFICATE OF CORRECTION

PATENT NO. : 7,051,836 B2 Page 1 of 1
APPLICATION NO. : 10/463641
DATED : May 30, 2006
INVENTOR(S) : Green, Sherry Jean It is certified that error appears in the above-identified patent and that said Letters Patent is hereby corrected as shown below:

Claims

Column 9, line 66. replace "swap" with --strap--.
Column 10, line 6, replace "swap" with --strap--

Signed and Sealed this

Twenty-second Day of August, 2006

JON W. DUDAS
*Director of the United States Patent and Trademark Office*